US010036896B2

(12) United States Patent
Hee et al.

(10) Patent No.: US 10,036,896 B2
(45) Date of Patent: Jul. 31, 2018

(54) LENS DRIVING DEVICE

(71) Applicants: Sul Hyun Hee, Shenzhen (CN); Yang Dea Yue, Shenzhen (CN); Kim Young Jin, Shenzhen (CN)

(72) Inventors: Sul Hyun Hee, Shenzhen (CN); Yang Dea Yue, Shenzhen (CN); Kim Young Jin, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 297 days.

(21) Appl. No.: 14/956,476

(22) Filed: Dec. 2, 2015

(65) Prior Publication Data

US 2016/0161757 A1 Jun. 9, 2016

(30) Foreign Application Priority Data

Dec. 4, 2014 (KR) .................. 10-2014-0173426

(51) Int. Cl.
*G02B 27/64* (2006.01)
*G02B 7/02* (2006.01)
*G02B 7/08* (2006.01)

(52) U.S. Cl.
CPC ......... *G02B 27/646* (2013.01); *G02B 7/026* (2013.01); *G02B 7/08* (2013.01)

(58) Field of Classification Search
CPC . G02B 27/64–27/648; H04N 5/2328–5/23287
See application file for complete search history.

(56) References Cited

U.S. PATENT DOCUMENTS

| 5,774,266 A * | 6/1998 | Otani | G02B 27/64 359/554 |
|---|---|---|---|
| 6,064,827 A * | 5/2000 | Toyoda | G02B 27/646 396/55 |
| 8,711,236 B2 * | 4/2014 | Shimizu | H04N 5/2253 348/208.99 |
| 9,036,260 B2 * | 5/2015 | Sugawara | G02B 7/08 359/557 |
| 9,304,326 B2 * | 4/2016 | Dong | G02B 27/646 |
| 9,366,879 B1 * | 6/2016 | Miller | G02B 27/646 |
| 2014/0009631 A1 * | 1/2014 | Topliss | G02B 27/646 348/208.11 |

* cited by examiner

*Primary Examiner* — Bumsuk Won
*Assistant Examiner* — Jeffrey Madonna
(74) *Attorney, Agent, or Firm* — Na Xu; IPro, PLLC

(57) ABSTRACT

A lens driving device is disclosed. The lens driving device includes a housing including a base, and a cover body forming a receiving space together with the base; a lens barrel assembled inside the housing and moveable along an optical axis of the lens barrel; an anti-shake carrier assembled inside the housing for suspending the lens barrel along the optical axis; an anti-shake spring having one end thereof fixed to the housing, and another end fixed on the anti-shake carrier; a plurality of bearing steel balls provided between the base and the anti-shake carrier for reducing friction force when the anti-shake carrier moves perpendicular to the optical axis; wherein the anti-shake carrier depends on elastic force of the anti-shake spring when it moves perpendicular to the optical axis, and the anti-shake carrier will return to an initial position.

8 Claims, 9 Drawing Sheets

LENS DRIVING DEVICE

FIELD OF THE INVENTION

The present invention is related to a type of lens module of camera, especially to a lens driving device having optical image stabilizing (OIS) function against the dithering images caused by shaking.

DESCRIPTION OF RELATED ART

Recently, portable terminals similar to smart phones and tablets are equipped with high-performance camera modules in addition to portable camera. High-performance lens module configured in the portable terminal generally has the functions of auto focusing and optical image stabilization. The function of optical image stabilization (OIS) can reduce the image shaking caused by external vibration or the trembling of user's hands. Optical anti-shaking function is divided into the lens shift type by which the lens moves along direction perpendicular to optical axis of camera and image sensor shift type by that the image sensor moves along the direction perpendicular to optional axis of lens. Normally, the portable terminal is equipped with the "lens shift type" lens module with optical image stabilization function.

The lens module with "lens offset type" optical image stabilization function, must have camera quickly returned to the base pivot (i.e., in situ) after photographing. Optical image stabilization lens module of related technologies determines the position and offset volume of the lens hall sensor, and provide suitable current coil to the stabilization (stabilization coil) to have the lens return to normal position. Consequent question is, hall sensor will cause the increase in the cost of lens module, and the camera module structure is complex, hence it is difficult to realize the miniaturization of camera module. In addition, the recovery action of lens in situ is accomplished by control circuit, hence the reset will be delayed, and the reliability is low.

Moreover, for purpose of the realization of automatic focusing (AF) function, optical image stabilization lens module powered with relevant technologies must supply AF (coil) with appropriate current coil to lifting movement of the lens. In order to energize the AF coil outside the lens module, the part like the suspension wire must be provided. However, it is extremely difficult to add suspension wire in the process of cascade and combination of multiple parts, therefore increasing the assembly difficulty of camera module, and the production efficiency is low.

Therefore, it is necessary to provide a new type of lens driving device to solve the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Figure 1:
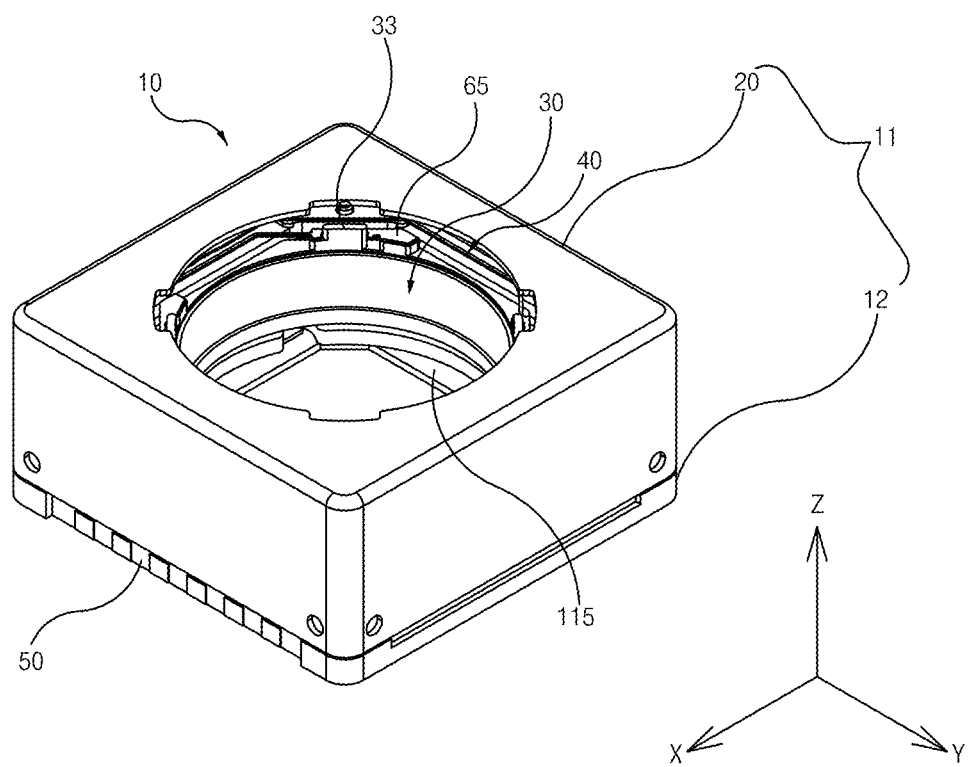
FIG. 1 is an isometric view of a lens driving device in accordance with an exemplary embodiment of the invention.

The present invention will hereinafter be described in detail with reference to an exemplary embodiment. It should be understood the specific embodiment described hereby is only to explain this disclosure, not intended to limit this disclosure.

Referring to FIGS. 1-5, a lens driving device 10 provided by the invention that can be applied in smartphones, laptop computers has AF (auto focusing) and OIS (optical image stabilization) functions. The lens driving device 10 includes a housing 11, a lens barrel 30, an anti-shake carrier 40, a permanent magnet 47, a magnet yoke 48, a focusing coil 39, an anti-shake coil 49, a flexible printed circuit board 50, a upper gasket 110, a lower gasket 115, a lower spring 53, an upper spring 60, an anti-shake spring 70 and a bearing steel ball 125.

The housing 11 includes a base 12 and a cover body 20 assembled with the base 12 to form an receiving space. The base 12 is one rectangular box body structure and includes a bottom surface 17 with a first opening 13, and four first columns 15 formed by protruding upward from the four corners of the base 17. A first connection bulge 16 is formed and stands out on the upper end of four first columns and connected with the upper gasket 110.

The cover body 20 includes a rectangular upper wall 25 and four side walls 23 extending and bending from the four corners of the upper wall 25. A middle part of the upper wall 25 forms a second opening (unlabeled). Light ray passes through the center of the said first opening 13 and the second opening and illuminate to imaging sensor (not shown) along the direction of optical axis of lens.

The lens barrel 30 has a through hole 31 extending along a direction parallel to an optic axis of lens. At least one lens (not shown) is fixed on an inner side wall of the lens barrel 30. The lens barrel 30 is received in the housing 11 and can move along the optical axis. An exterior 32 of the lens barrel 30 is surrounded by the focusing coil 39.

The anti-shake carrier 40 is one rectangular box-shaped component set encircling the lens barrel 30 and can move in the receiving space of the housing 11 along the direction perpendicular to optical axis, namely the direction parallel to XY plane. The anti-shake carrier 40 includes four second columns 41 extending from four corners along the direction of optical axis. A mounting groove 43 is formed between adjacent two columns to accommodate the permanent magnet 47. The said anti-shake carrier 40 is used for supporting the lens barrel 30 and providing localization guidance for the lens barrel 30 to make the lens barrel 30 to move along the optic axis.

The permanent magnet 47 is four pieces in this embodiment and is mounted in four mounting grooves 43 of the anti-shake carrier 40 respectively. The four permanent magnets 47 are assembled inside the housing 11 and set oppositely with the inner side wall of four side walls 23 of the cover body. There are four magnet yokes 48 assembled under the anti-shake carrier 40 for forming a magnetic body. Four anti-shake coils 49 are arranged on the inner side walls of four side walls of the cover body 2 respectively and set oppositely to the four permanent magnets 47. Specifically, a flexible printed circuit board 50 is fixed on the inner side surface of the side wall 23. The four anti-shake coils 49 are wound on and supported by the flexible printed circuit board 50.

The anti-shake coil 49 is connected with the flexible printed circuit board 50 electrically. The lower end of one side of the flexible printed circuit board 50 protrudes toward the exterior of the housing 11 and is connected with an exterior source electrically. The anti-shake spring 70 is made of metal conducting materials. The anti-shake spring 70 can be connected electrically with the upper spring 60. The upper spring 60 can be connected with end of the focusing coil 39 and powered up. The lens driving device 10 can supply power to the anti-shake coil 49 from the exterior of housing 11 through the flexible printed circuit board 50 and can supply power to the focusing coil 39 through the flexible printed circuit board 50, the anti-shake spring 70 and the upper spring 60.

In addition, as the lens driving device 10 can be constructed through assembling the lens barrel 30, the anti-shake carrier 40, the upper spring 60 and the anti-shake spring 70. Power is supplied to the focusing coil 39 through the anti-shake spring 70 and the upper spring 60.

The invention is not limited to the above-mentioned mode of execution, for example, the lower part of the spring 53 is made of electric conductor and can be contacted and power is supplied with the end of the focusing coil 39 and the flexible circuit board 50, so the power can be supplied to the anti-shake coil 49 through the flexible circuit board 50 and electric power is transmitted to the focusing coil 39 through the flexible circuit board 50 and the lower part spring 53 to form the power-supply loop of the anti-shake coil 49 and the focusing coil 39.

The lower gasket 115 is the rectangular box-shaped component with a third opening 116 penetrating therethrough and formed along the direction of the optical axis. Its parts are assembled between the bottom surface 17 of the base 12 and the anti-shake carrier 40 and used for limiting the movement range when lens barrel 3 moves along the direction of Z axis. The lower end of the four second columns 41 of the anti-shake carrier 40 extends downward and forms a first and second interconnecting bulge 16. The first and second interconnecting bulge 16 insert and are connected in four corners of the lower gasket 115 and a first interconnecting groove 18 to engage the lower gasket 115 with the anti-shake carrier 40.

The quantity of the bearing steel ball 125 is four and the bearing steel balls 125 are assembled between the base 12 and the lower gasket 115 for reducing the friction when the anti-shake carrier 40 moves along the direction perpendicular to optical axis. In order not to let the four bearing steel ball 125 break away from the given position, there are four upper mounting grooves 120 arranged in the lower side faces of the four corners of the lower gasket used to mount the upper end of the four bearing steel balls 125 one by one. In addition, there are four lower mounting grooves 18 used for mounting the lower end part of the four bearing steel balls 125.

Figure 2:
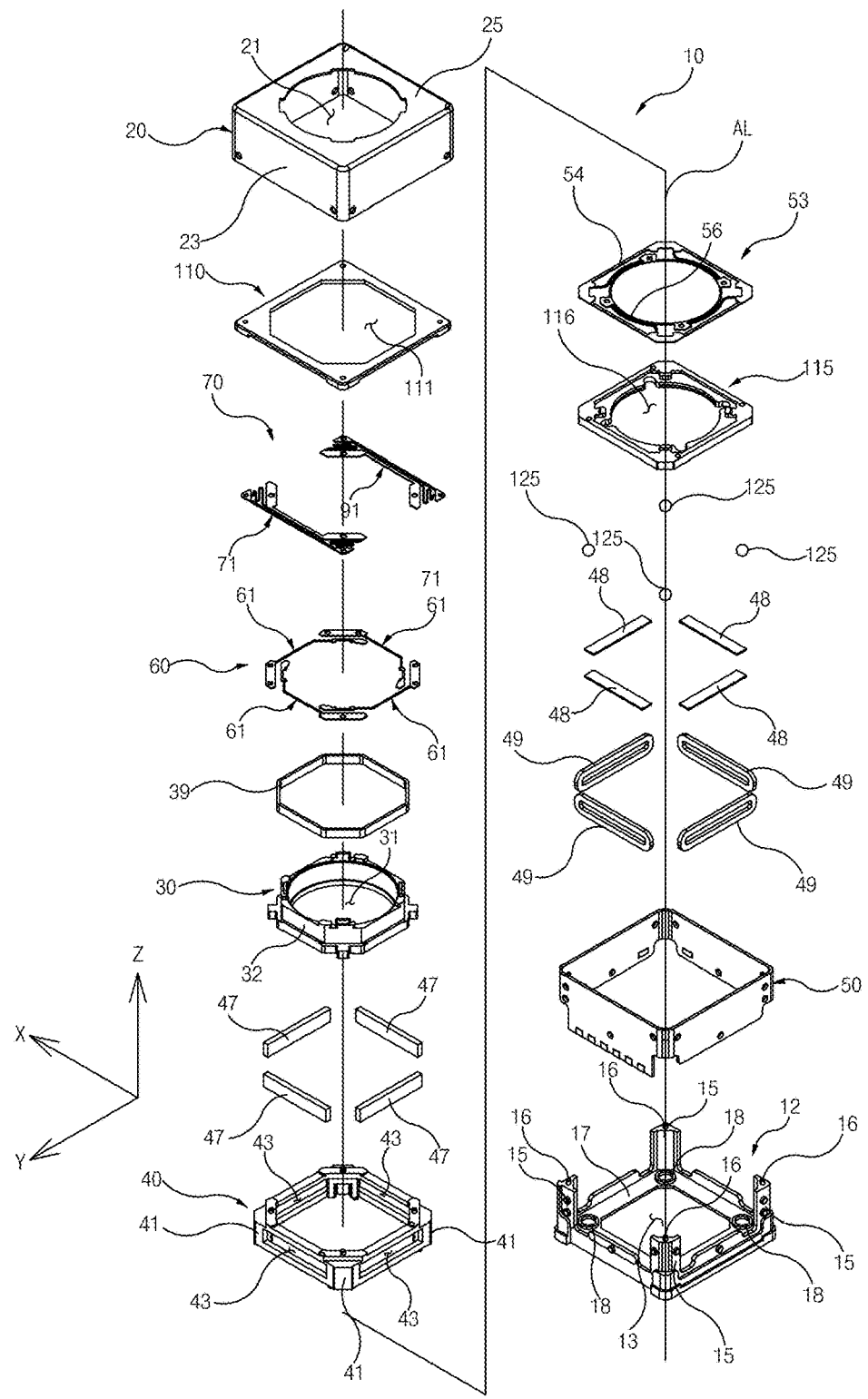
FIG. 2 is an exploded and isometric view of the lens driving device in FIG. 1.
Figure 3:
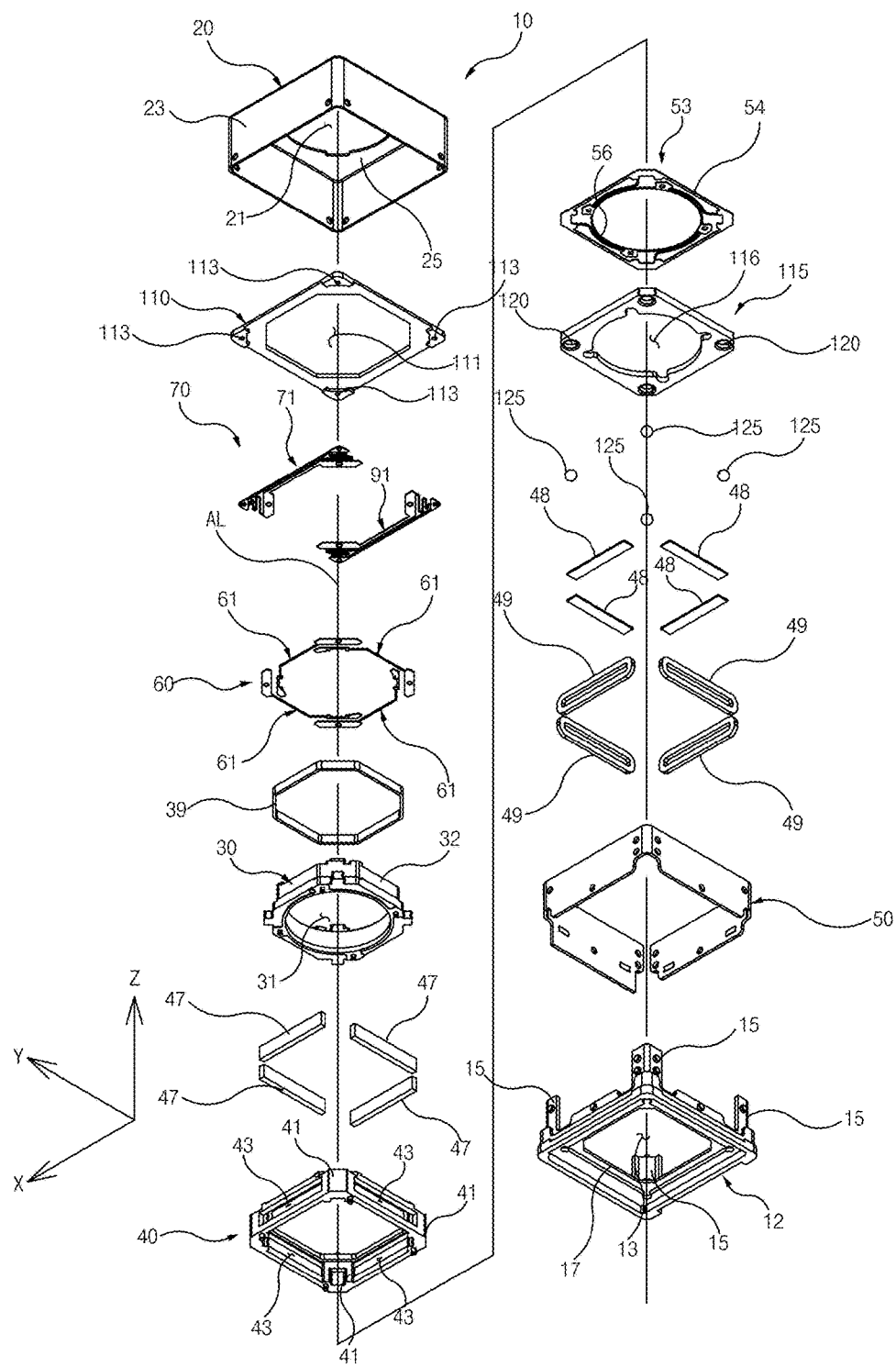
FIG. 3 is similar to FIG. 2, but from another aspect.
Figure 4:
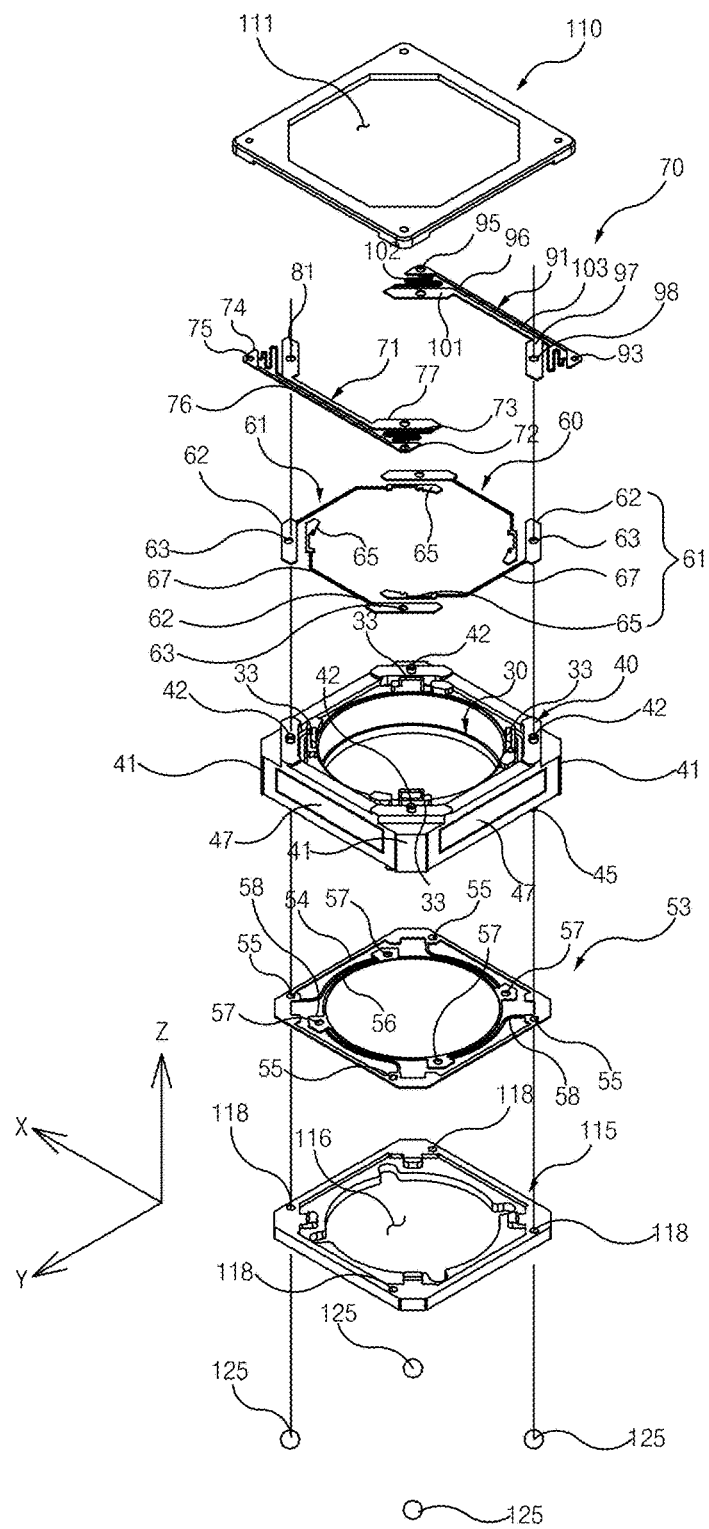
FIG. 4 is an exploded and isometric view of the lens driving device, with partial components thereof removed.
Figure 5:
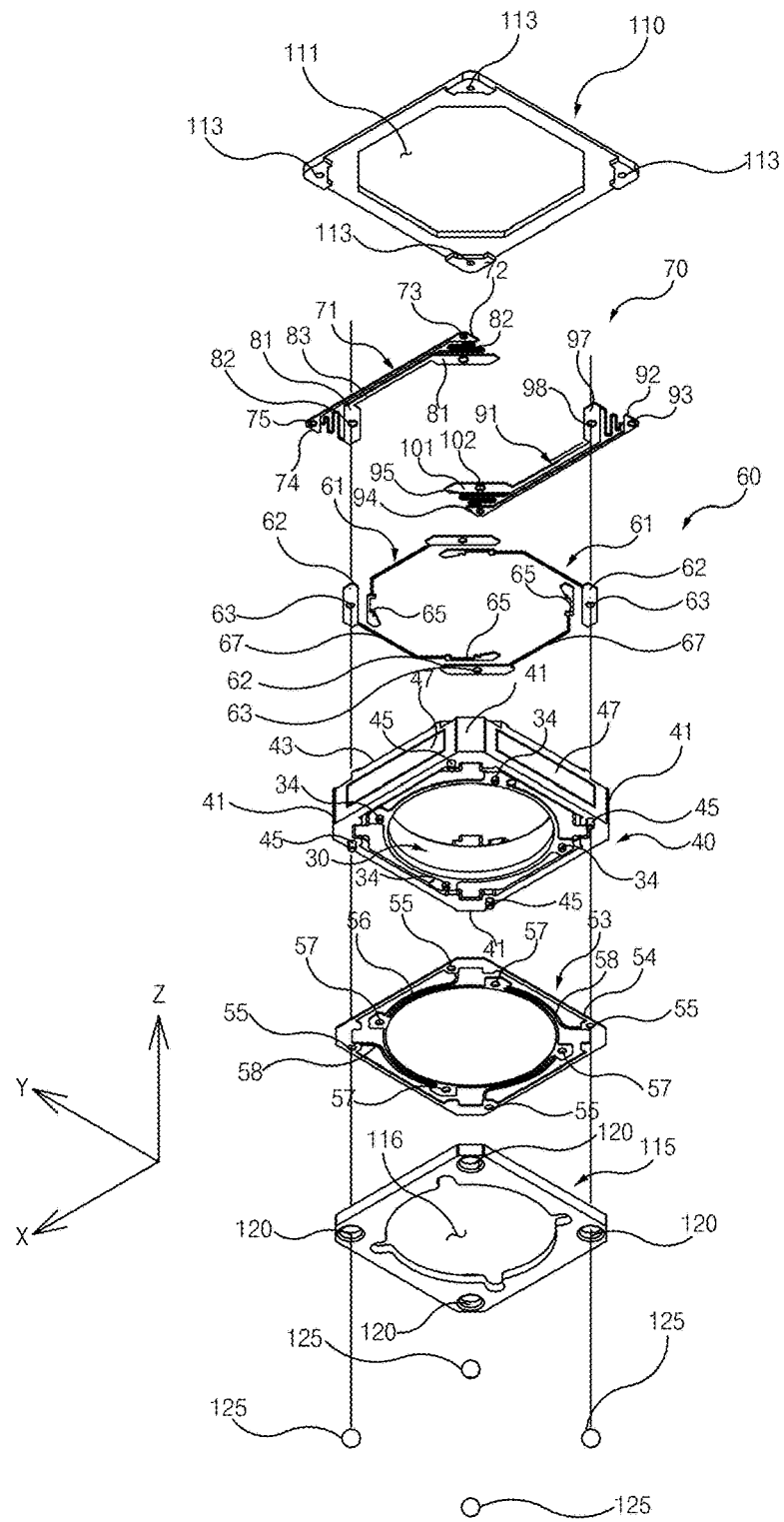
FIG. 5 is an exploded and isometric view of the lens driving device from an aspect same to FIG. 3, with partial components thereof removed.

As shown in FIG. 2, in order to ensure that the bearing steel ball 125 will not be broken away from the lower mounting groove 18 and roll towards along a direction perpendicular to optical axis, the inner diameter of the lower mounting groove 18 is larger than the diameter of bearing steel ball 125.

The lower mounting groove 18 and the upper mounting groove 120 cannot extend along the direction perpendicular to optical axis, so the anti-shake coil 49 generates electromagnetic force in the magnetic field of the anti-shake carrier 40. The anti-shake carrier 40 moves perpendicularly to the optical axis. The anti-shake carrier 40 moves to the target point at shortest distance instead of reaching target point tortuously along the specific direction.

The upper gasket 110 mentioned above is a rectangular frame component, with a fourth opening 111 which is following the direction of optical axis of camera lens in its center. And it is assembled between the inner side surface of upper wall 25 of the mentioned cover body 20 and the anti-shake carrier 40. There is a second connecting groove 113 in the lower side surface of those four corners of the mentioned upper gasket 110. And a first connecting protuberance 16 which is lying on the top of those four first cylinder 15 of the base 12 mentioned above is inlaid into those four second connecting groove 113, so that the upper gasket 110 mentioned above can be fixed on base 12.

The lower spring 53 mentioned above as well as the upper spring 60 are used to prevent the mentioned lens barrel 30 from oscillating up and down in the outer cover 11, which is caused by unexpected impact or shake. When the lens barrel 30 moves along the optic axis, in other words, when it moves along the Z axis and breaks away from the acquiescent original position, the lower spring 53 as well as the upper spring 60 can make lens barrel 30 recover its original position by using the elasticity to finish pressurizing. The lower spring 53 is assembled between the lower gasket 115 and the bottom of the lens barrel 30, while the upper spring 60 is assembled between the upper gasket 110 and the top of Lens Barrel 30.

Specifically speaking, the lower spring 53 is a platy spring with a rectangular frame 54 corresponding to the upper rectangle of the lower gasket 115, a rounded frame 56 corresponding to the lower rounded shape of Lens Barrel 30, and a lower connecting beam 58 which connects rectangular frame 54 with rounded frame 56. The second connecting protuberance 45 of the anti-shake carrier 40 passes through the first connecting through-hole 55 of those four corners of the rectangular frame 54 mentioned above and is inserted into the first connecting groove 118 of the lower gasket 115 mentioned above. Thus the frame 54 can be connected with the lower gasket 115. In addition, the bottom of the lens barrel 30 protrudes downward, forming four third connecting protuberances 34. And those four third connecting protuberances 34 are inlaid into those four second connecting through-holes 57 of the rounded frame 56 mentioned above, which can connect the rounded frame 56 with the lens barrel 30 mentioned above.

The upper spring 60 mentioned above has four plate springs 61. And the plate spring 61 respectively has a first end region 62 which is installed on the top of the anti-shake carrier 40, a second end region 65 which is on the top of the lens barrel 30 and the upper connecting beam 67 which connects the first end region 62 with the second end region 65. Specifically speaking, the upper ends of the four second cylinders 41 of the anti-shake carrier 40 mentioned above respectively protrude upward, forming a fourth connecting protuberance 42. And the third connecting through-hole 63 which can inlay the fourth connecting protuberance 42 is forming on the first end region 62 mentioned above. The fourth connecting protuberance 42 is inlaid into the third connecting through-hole 63 mentioned above, and connects the first end region 62 of upper spring 60 on the top of anti-shake carrier 40. In addition, the upper end of the lens barrel 30 protrudes upward, forming four fifth connecting protuberance 33. The second end regions 65 of those four plate springs 61 are respectively inlaid into the fifth connecting protuberance 33 mentioned above, so that the second end region 65 can be squeezed around the fifth connecting protuberance 33 by using the elasticity to pressurize.

The anti-shake spring 70 mentioned above is assembled into the outer cover 11, lying between the upper gasket 110 and upper spring 60, with one side being connected with the base 12 and the other being connected on the top of the anti-shake carrier 40. The anti-shake spring 70 is used to guide and limit the moving range of the anti-shake carrier 40 when it moves perpendicularly to the optical axis. In addition, when the anti-shake carrier 40 moves perpendicularly to the optical axis and breaks away from its acquiescent original position, the anti-shake spring 70 will make it be back to its original position through the elastic force.

Figure 6:
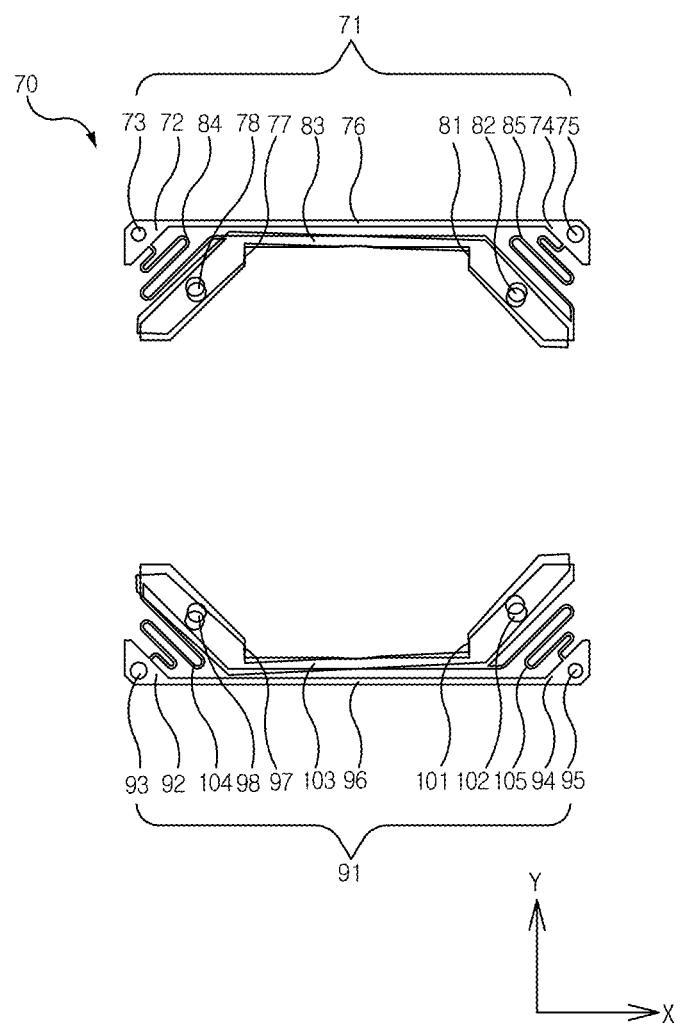
FIG. 6 is an illustrative view showing elastic deformation of anti-shake springs when an anti-shake carrier of the lens driving device moves along a negative direction of X-axis.

The anti-shake spring 70 includes a first plate spring 71 and a second plate spring 91 that are set with relative array and interval along the optical axis direction. The first plate spring 71 and the second plate spring 91 are respectively connected to the housing 11 and the first beams 76,96 connected with the first outer ends 72, 92, and the second outer ends 74, 94. The second beams 83,103 of connecting the first inner ends 77,97 and the second inner ends 81,101 connected to the upper end of the anti-shake carrier 40 and set intervally and mutually. The first interconnecting parts 84,104 connecting with the first outer ends 72,92 and the first inner ends 77,97. The second interconnecting parts 85,105 connecting with the second outer ends 74,94 and the second inner ends 81 and 101. Refer to FIG. 6 for details. When the anti-shake carrier 40 is away from the initial position, the first interconnecting parts 84,104 and the second interconnecting parts 85,105 reset the anti-shake carrier 40 to initial position through elastic force.

Specifically, the first outer ends 72, 92 and the second outer ends 74, 94 have formed connecting holes 73, 75, 93, 95. The first connecting hump 16 on the top of the first column at the base 12 is built in the connecting holes 73, 75, 93, 95 and is inserted into the second connecting groove 113 of the upper end gasket 110, which makes the first outer ends 72, 92 and second outer ends 74, 94 be connected and fixed on the base 12. For details, please see FIG. 2. Besides, the first inner ends 77, 97 and the second inner ends 81, 101 have formed connecting holes 78, 82, 98, 102. The fourth connecting hump 42 formed at the upper end of the second column 41 on the anti-shake carrier 40 and the third connecting hole 63 at the upper part spring 60 are also built in the anti-shake spring 70 connecting holes 78, 82, 98, 102. The first inner end 77, 97 and second inner end 81, 101 of the anti-shake spring are fixed and connected on the upper end of the image stabilizer carrier 40.

On the other hand, the FIGS. 2-5 disclose that the anti-shake spring 70 is assembled between the upper wall 25 of the cover 20 and the anti-shake carrier 40. More specifically, it is assembled between the upper gasket 110 and the upper spring 60. But this invention is not limited so. The anti-shake spring 70 can also be assembled between the bottom 17 of the base 12 and the anti-shake carrier 40. For example, one side of the anti-shake spring 70 is connected to the bottom 17 of the base while the other side could be connected to the bottom gasket 115. So, the anti-shake spring 70 could sure form the penetrating hole corresponding to the bearing steel ball 125.

In order to realize automatic focusing, the lens driving device 10 shall be operated as shown in the figure below. When the current passes through focusing coil 39, the focusing coil 39 would generate electromagnetic force under the magnetic field of the permanent magnet 50. Relying on this electromagnetic force, the lens barrel 30 may move within the moving range defaulted in the housing 11. And the anti-shake carrier 40 could ascend or descend under status of being supported, thus to move to height meeting the camera focus. The height of lens barrel 30 meeting the focus is the position that makes the focusing coil 39 to winded on lens barrel 30 to generate electromagnetic force reaching balance with elastic force generated by upper spring 60 and lower spring 53. Besides, if the current passing through the focusing coil 39 stops, the anti-shake carrier 40 could return back to the initial position by the elastic forces of the upper spring 60 and the lower spring 53.

In order to realize anti-shake function, the lens driving device 10 has the following acts. Install gyro sensor in the portable terminal equipped with such invented lens driving device to sense shakes of portable terminal due to shake of hands; when current passes through anti-shake coil 49, relying on electromagnetic force between the permanent magnet 47 and the anti-shake coil 49, the carrier 40 and the lens barrel 30 moves from initial position towards direction vertical to optic axis within the housing 11, namely direction parallel to XY plane, and makes imaging of image sensor (no illustration) reduce position movement. This changed position is the place realizing balance by electromagnetic force of anti-shake carrier 40 and elastic force of anti-shake spring 70. Moreover, if cutting the current passing through coil 49, the anti-shake carrier 40 and its supporting Lens Barrel 30 could return back to initial position by elastic force of anti-shake spring 70.

According to FIGS. 6-9, if the anti-shake carrier 40 leaves its default initial position, the first inner ends 77, 97 and second inner ends 81, 101 connecting with the anti-shake carrier 40 moves along direction parallel to XY plane, and the first interconnecting parts 84, 104 and the second interconnecting parts 85, 105 can be returned back to initial position through deformation of spring. After that, hand shake is reduced gradually or the current of anti-shake coil 49 is cut off after finishing camera shooting, the deformed first interconnecting part 84, 104 and second connecting parts 85, 105 could return back to original shape, and the first inner ends 77, 97 and second inner ends 81, 101 could return back to initial position as well, which makes the anti-shake carrier 40 that is connected to the anti-shake spring 70 be resumed back to initial position.

Specifically, shown as FIG. 6, when the anti-shake carrier 40 moves along the negative direction of X axis on the original position, it is one embodiment of deformation situation of the first inner ends 77, 97 and the second inner ends 81,101 and the changed position. When it is expanded, the first inner ends 77, 97, the second inner ends 81,101 of the first plate spring 71, and the second plate spring 91 move towards negative direction of X axis. The first inner ends 77, 97 of the first plate spring 71 and the second plate spring 91 towards the first outer ends 72, 92 slightly. The second inner ends 81,101 of the first plate spring 71 and the second plate spring 91 are slightly deviated from the second outer ends 74, 94.

Figure 7:
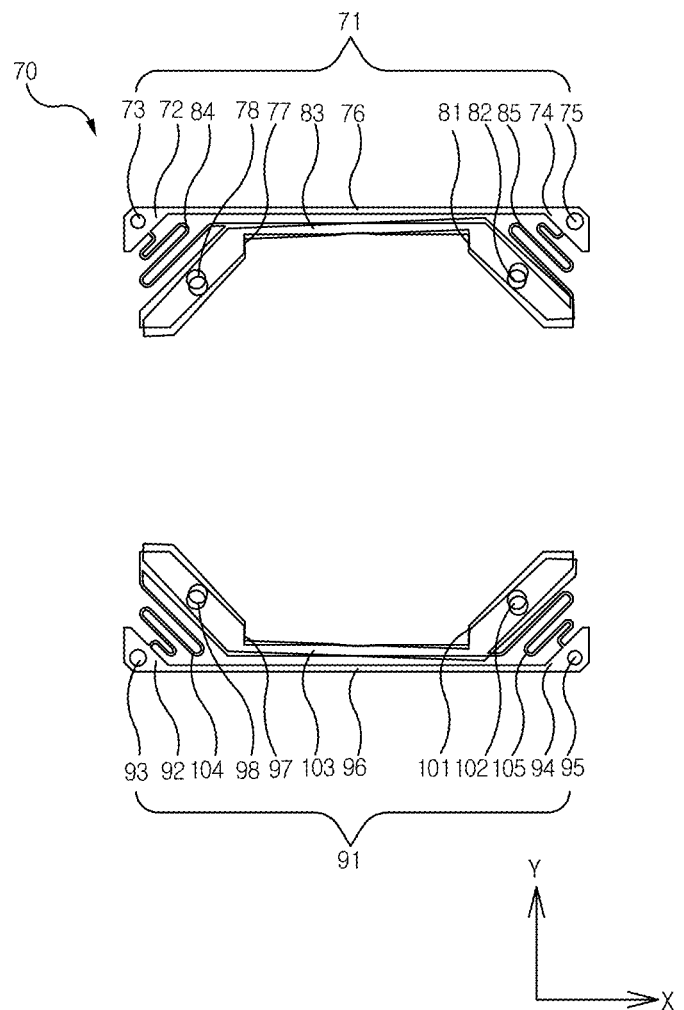
FIG. 7 is an illustrative view showing elastic deformation of the anti-shake spring when the anti-shake carrier of the lens driving device moves along a positive direction of X-axis.

Shown as FIG. 7, when the anti-shake carrier 40 moves from original position to the positive direction of X axis, the changed position of the first inner ends 77, 97 and the second inner ends 81 and 101 is worked as an embodiment. The first inner ends 77,97 and the second inner ends 81,101 of the first plate spring 71 and the second plate spring 91 is slightly deviated from the first outer ends 72 and 92. The second inner ends 81 and 101 of the first plate spring 71 and the second plate spring 91 slightly are towards the second outer ends 74 and 94.

The first inner ends 77, 97 and the second inner ends 81, 101 of the first plate spring 71 and the second plate spring 91 move together towards the positive direction of X axis. The first inner ends 77 and 97 of the first plate spring 71 and the second plate spring 91 are slightly deviated from the first outer ends 72 and 92. The second inner ends 81 and 101 of the first plate spring 71 and the second plate spring 91 are slightly deviate the second outer ends 74 and 94.

Figure 8:
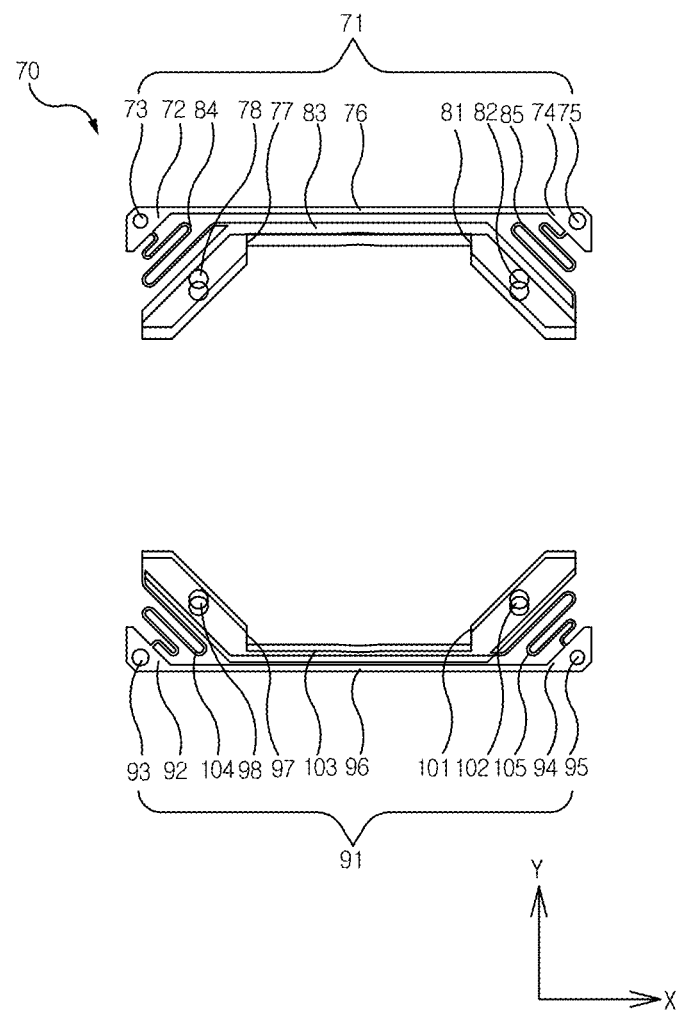
FIG. 8 is an illustrative view showing elastic deformation of the anti-shake spring when the anti-shake carrier of the lens driving device moves along a negative direction of Y-axis.

Shown as in FIG. 8, when the anti-shake carrier 40 moves from original position to the negative direction of Y axis, the changed positions of the first inner ends 77 and 97 and the second inner ends 81 and 101 are used as one embodiment. The first inner end 77, the second inner end 81 and the second beam 83 of the first plate spring 71 move parallel to the negative direction of Y axis and deviate slightly from the first beam 76 of the first plate spring 71. The first inner end 97 of the second plate spring 91, the second inner end 101 and the second beam 103 move parallel to the negative direction of Y axis and slightly deviate the first beam 96 of the second plate spring 91.

The first inner end 97, the second inner end 101 and the second beam 103 of the second plate spring 91 move parallel to the positive direction of Y axis and slightly deviate the first beam 96 of the second plate spring 91.

Figure 9:
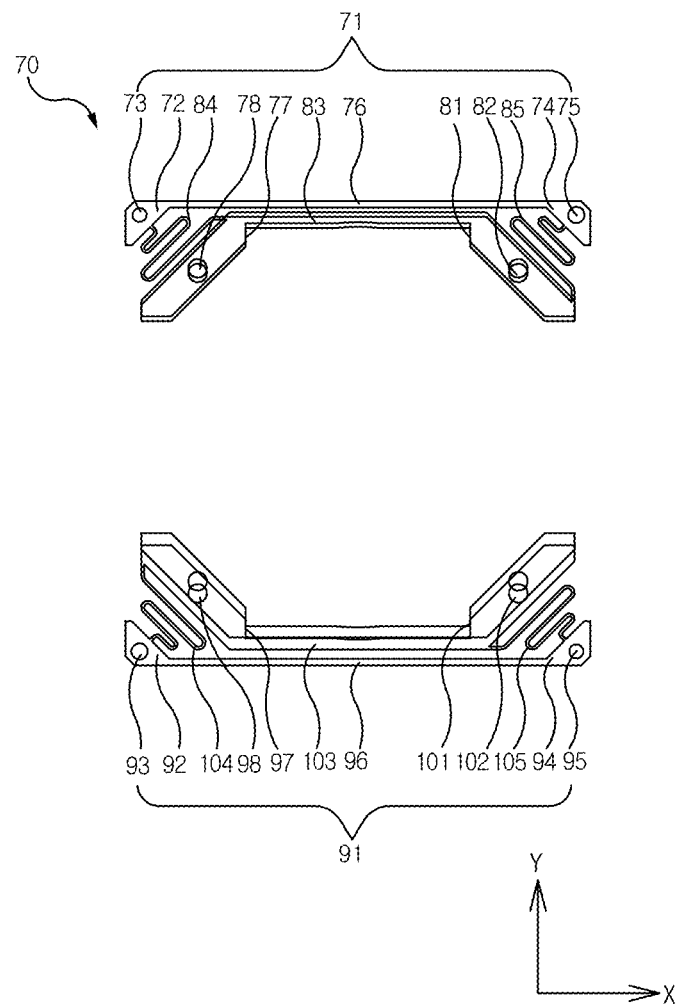
FIG. 9 is an illustrative view showing elastic deformation of the anti-shake spring when the anti-shake carrier of the lens driving device moves along a positive direction of Y-axis.

Shown as in FIG. 9, when the anti-shake carrier 40 moves from initial position to the positive direction of Y axis, the changed positions of the first inner ends 77,97 and the second inner ends 81,101 work as one embodiment. The first inner end 77, the second inner end 81 and the second beam 83 of the first plate spring 71 move parallel to positive direction of Y axis slightly deviate the first beam of the first plate spring 71. The first inner end 97, the second inner end 101 and the second beam 103 of the second plate spring 91 move parallel to the positive direction of Y axis and slightly deviate from the first beam 96 of the second plate spring 91.

In addition, no Hall image sensor should be set in the lens position of lens driving device of the invention. Hall image sensor can be set when the lens position needs to be determined auxiliary.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens driving device, comprising:
   a housing including a base, and a cover body forming a receiving space together with the base;
   a lens barrel assembled inside the housing and moveable along an optical axis of the lens barrel;
   an anti-shake carrier assembled inside the housing for suspending the lens barrel along the optical axis;
   an anti-shake spring having one end thereof fixed to the housing, and another end fixed on the anti-shake carrier;
   a plurality of bearing steel balls provided between the base and the anti-shake carrier for reducing friction force when the anti-shake carrier moves perpendicular to the optical axis; wherein the anti-shake carrier depends on elastic force of the anti-shake spring when it moves perpendicular to the optical axis, and the anti-shake carrier will return to an initial position;
   a lower gasket assembled between the base and the anti-shake carrier for limiting movement range of the lens barrel;
   an upper spring located between an upper side wall of the cover and an upper end of the lens barrel; and
   a lower spring located between the lower gasket and the lens barrel;
   wherein an upper end mounting groove corresponding to the bearing steel balls are provided at a lower surface of the lower gasket.

2. The lens driving device as described in claim 1, wherein a surface of the base facing the lower gasket forms a lower mounting groove corresponding to the bearing steel balls for receiving lower ends of the bearing steel balls, an inner diameter of the lower end mounting groove is greater than a diameter of the bearing steel ball, and one of the lower end mounting groove and the upper end mounting groove extends along a direction not perpendicular to the optical axis.

3. The lens driving device as described in claim 1, wherein the anti-shake spring includes a first spring and a second spring opposed to each other, each of the first and second springs includes a first and second outer ends, a first and second inner ends, a first beam, a second beam, a first connecting part, and a second connecting part, the first and second outer ends of the first spring respectively connecting to the housing, the first and second outer ends of the second spring respectively connecting to the housing, the first beam of the first spring connecting to the first and second outer ends of the first spring, the first beam of the second spring connecting to the first and second outer ends of the second spring, the first and the second inner ends of the first spring respectively fixing and connecting to the anti-shake carrier, the first and the second inner ends of the second spring respectively fixing and connecting to the anti-shake carrier, the second beam of the first spring connecting to the first and second inner ends of the first spring, the second beam of the second spring connecting to the first and second inner ends of the second spring, a first connecting part of the first spring connecting the first outer end and the first inner end of the first spring, a first connecting part of the second spring connecting the first outer end and the first inner end of the second spring, the second connecting part of the first spring connected to the second outer end and the second inner end of the first spring, the second connecting part of the second spring connected to the second outer end and the second inner end of the second spring, wherein the first and second connecting parts of each of the first and second springs urge the anti-shake carrier to return to the initial positions via elastic force when the anti-shake carrier leave the initial position.

4. The lens driving device as described in claim 3, wherein the first and second outer ends are fixed on upper end of the base, and the first and second inner ends are fixed on upper end of anti-shake carrier.

5. The lens driving device as described in claim 4 further including a permanent magnet assembled with the anti-shake carrier, a focusing coil surrounding an outer surface of the lens barrel, and an anti-shake coil attached to an inner side surface of the housing and opposed to the permanent magnet.

6. The lens driving device as described in claim 5 further including a flexible printed circuit board for providing power to the focusing coil and the anti-shake coil, wherein the flexible printed circuit board is assembled on an upper side of the upper spring, the flexible printed circuit board, the anti-shake spring, the upper spring, and the focusing are electrically connected to each other, and the lens driving device is powered via the focusing coil from flexible printed circuit board.

7. The lens driving device as described in claim 1, wherein the anti-shake spring is assembled between the upper side wall of the cover body and the lower end of the anti-shake carrier.

8. The lens driving device as described in claim 1, wherein the anti-shake spring is assembled between the base and the upper end of the anti-shake carrier.

* * * * *